(12) United States Patent
Bodnar

(10) Patent No.: US 6,542,950 B1
(45) Date of Patent: Apr. 1, 2003

(54) SELF-ADAPTIVE PROCESSOR OVERLOAD CONTROL SYSTEM

(75) Inventor: Bohdan Lew Bodnar, Park Ridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,923

(22) Filed: May 5, 2000

(51) Int. Cl.[7] ................................................. G06F 9/46
(52) U.S. Cl. ...................................................... 710/260
(58) Field of Search ................................. 710/260, 263, 710/264

(56) References Cited

U.S. PATENT DOCUMENTS 5,708,814 A * 1/1998 Short et al. ................. 710/260
5,931,936 A * 8/1999 Chung et al. ............... 710/263
6,353,616 B1 * 3/2002 Elwalid et al. ............. 370/389

* cited by examiner

*Primary Examiner*—Xuan M. Thai
(74) *Attorney, Agent, or Firm*—Patton Boggs

(57) ABSTRACT

The self-adaptive processor overload control system provides real time overload control and is fast to respond to processing overload conditions. The self-adaptive processor overload control system can detect surges and also has a dynamic range that can address overloads of significant size. It matches software operation to the CPU instruction cache operation to thereby increase the processor efficiency by reducing the average real time needed to process call activity. The self-adaptive processor overload control system maintains a counter for each queue, and sets a threshold value for each queue. The self-adaptive processor overload control system completely empties each queue to obtain a higher cache hit ratio, since code to serve each request is queued in cache memory and when successive requests on the same nature save on code retrieval time. The self-adaptive processor overload control system dynamically adjusts the queue size by starting low, then if the occupancy is low, linearly increases the queue size. If an overload condition is detected, then the self-adaptive processor overload control system significantly reduces the size of the queue to protect the processor. Once the overload condition has cleared, the self-adaptive processor overload control system resumes increasing the queue size. The overload is delegated outboard to the peripherals generating the overload of service requests rather than concentrating the overload at the processor.

18 Claims, 4 Drawing Sheets

SYSTEM PERSPECTIVE

SELF-ADAPTIVE PROCESSOR OVERLOAD CONTROL SYSTEM

FIELD OF THE INVENTION

This invention relates to processor-based systems and, in particular, to an overload control process that adapts to a detected overload condition in the processor and adjusts the operating parameters of the processor to process service requests without endangering the continuing operation of the processor. This overload control is suitable for systems such as telephone switching systems.

Problem

It is a problem in the field of processor-based systems that the plurality of peripheral devices, which are in communication with the processor, generate service requests in a manner that can be highly variable. Existing processor overload management systems typically rely on parameters that are hard coded to guide the operation of the processor. However, these parameters render the processor overload management system immutable in operation and, as the nature of the peripherals changes, these parameters are mismatched with the operation of the processor. If the offered traffic load changes, then the operation of the processor is tuned for the wrong environment. Existing processor overload management systems can also shut down the processor in severe overload conditions and typically do not address the load presented to the processor by processes other than the primary service processes. These existing processor overload management systems are typically relatively slow to respond to overloads and/or of limited operational range since they depend on "smoothed" estimates of parameters that are used to estimate load on the processor. For example, occupancy (utilization) estimates may require several samples, each of which can be several seconds long. The utilization is estimated by maintaining a running average of these samples. As a result, these processor overload management systems are slow to react to rapid traffic changes (such as surges) and cannot clamp the overload before the adverse effects caused by the overload impact the processor.

Overload controls in telephone switching systems, such as the #5ESS switching system manufactured by Lucent Technologies, attempt to keep the processor that manages the call processing (Switching Module Processor in the #5ESS) running at a predetermined utilization. Since the amount of processing time needed to accept or throw out a work request is substantially less than the amount of processing time needed to process the work request (for instance, setting up a telephone call), existing overload controls usually do not control the amount of work accepted from peripherals. Typically, peripherals (such as line units) are polled to see if any work (such as callers going off-hook or on-hook) exists, and the work requests are time-stamped and queued in temporary storage queues. As stated above, the time required to poll the peripherals and queue the requests is a small fraction of the time required to process the desired work. This polling is usually done at a high priority and is done periodically. Once polling is halted, the work requests are "metered" out of the temporary storage and "real" work commences. The amount of requested work removed from temporary storage is determined by the overload control. This "real" work is usually done at a lower priority than the polling. Periodically, a scan is made of the queued work to see if any requests are queued too long; if such excessively delayed work is found, it is removed from temporary storage and discarded (this is sometimes called "cleanup activity"). If the cleanup activity takes too long, maintenance work may be scheduled to determine why a given type of cleanup is taking so long (for instance, a peripheral may be malfunctioning and generating false work requests). Since cleanup is believed to be a rare occurrence, maintenance work runs at a very low priority. Under normal call processing conditions, equilibrium exists: calls are set up, calls are torn down, call processing operates normally, there is no cleanup work or maintenance work initiated by excessively delayed cleanup work. The utilization of the processor is dominated by the real-time that is expended in setting up and tearing down calls. In the case where the offered work load increases, there is an increase in queue loading work which runs at a high priority and which slightly raises the processor's utilization. The existing overload control reduces the rate at which (the temporary storage) queues are unloaded to compensate for this activity, thereby reducing call processing activity. This results in a commensurate increase in call setup delays. A new equilibrium is typically reached where the incoming call request rate is equal to the call setup rate, although the setup delays increase as a result. If the increase in offered load continues, then the time spent by each work request in queue becomes excessive and canceled work request cleanup activity is initiated. This cleanup work is counterproductive in that it represents extra work for the processor, increases utilization of the processor but does not result in more call completions.

In this processor overload management system paradigm, if the offered load increases rapidly ("surge"), then call processing can be momentarily terminated since the real-time capability of the processor is dedicated to inputting call set up requests. In addition, the overload control is not in control of the processor since it is capable only of determining how many work requests are to be removed from the temporary storage queues. The processor is now operating at an extremely high utilization with much of the work load being high priority work (polling peripherals and moving work requests to temporary storage) that is processed, some lower priority cleanup work which is processed very slowly, and some call processing work. If the cleanup activity is successful in removing user requests for service, and if the users are impatient to obtain service, then they try again to obtain service (for instance, using automatic redialers). The processor now sees not only "useful" work, but also user retries, cleanup work, and, possibly, maintenance work. Very few work requests are removed from the temporary storage queues since the majority of the processor's time is spent accepting work requests, moving them to temporary storage, throwing these requests away, and running cleanup work. Thus, existing processor overload management systems can substantially reduce system performance in severe overload conditions. These existing processor overload management systems are typically relatively slow to respond to sudden overloads and/or of limited operational range. As a result, these processor overload management systems cannot clamp the overload before the adverse effects caused by the overload impact the processor.

Solution

The above described problems are solved and a technical advance achieved by the self-adaptive processor overload control system which provides real time overload control and is fast to respond to processing overload conditions. The self-adaptive processor overload control system can detect surges and also has a dynamic range that can address overloads of significant size. It matches software operation to the CPU instruction cache operation to thereby increase the processor efficiency by reducing the average real time needed to process call activity.

The self-adaptive processor overload control system maintains a counter for each peripheral, and sets a threshold value for each peripheral. The self-adaptive processor overload control system completely empties each temporary storage queue to obtain a higher cache hit ratio, since code to serve each request is queued in cache memory and when successive requests on the same nature save on code retrieval time. That is, all the work associated with a given peripheral class ("class" being, for instance, line units, trunk units, and so forth) is processed before the next peripheral class's work is done. The self-adaptive processor overload control system dynamically adjusts the maximum amount of work requests unloaded from a peripheral by starting low, then if the processor's occupancy is low, rapidly increases this maximum value. If an overload condition is detected, then the self-adaptive processor overload control system significantly reduces the maximum number of work requests that can be unloaded from a peripheral to protect the processor. Once the overload condition has cleared, the self-adaptive processor overload control system resumes increasing this maximum unloading value. The overload is delegated outboard to the peripherals generating the overload of service requests rather than concentrating the overload at the processor.

DETAILED DESCRIPTION

Figure 1:
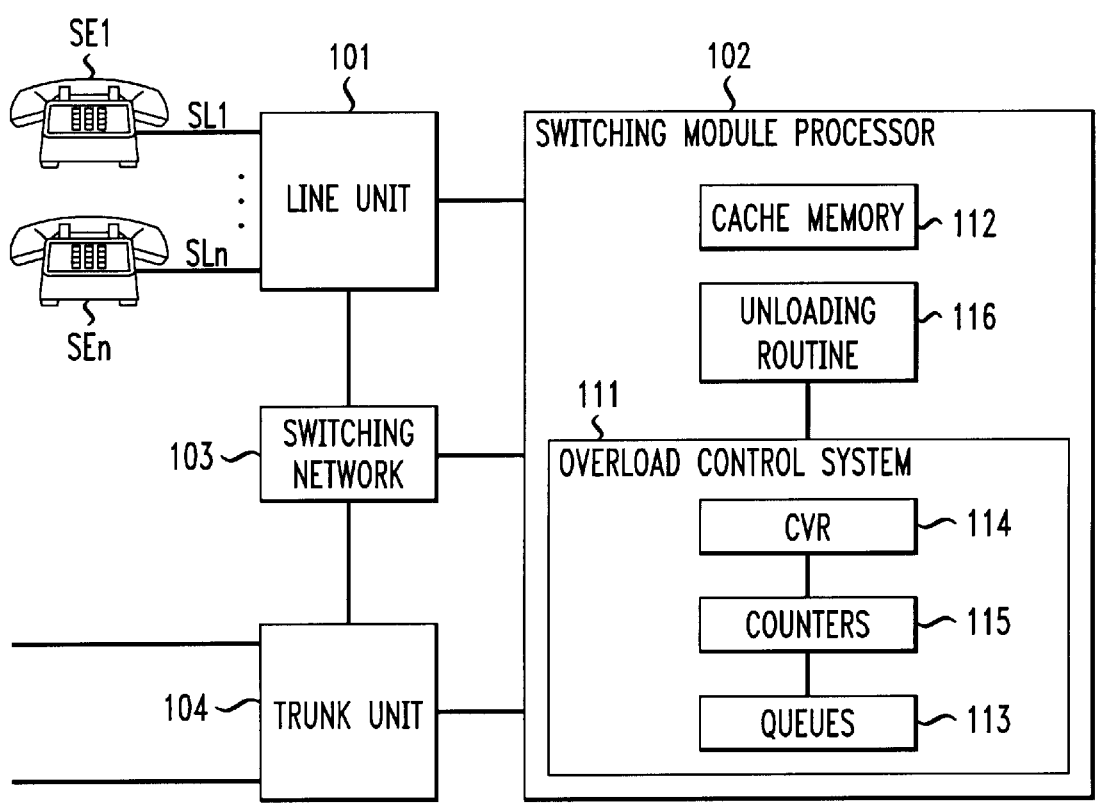
FIG. 1 illustrates in block diagram form the present self-adaptive processor overload control system as implemented in a typical processor-based system wherein a processor is network connected with a plurality of peripheral devices which generate service requests for service by the processor.
Figure 2:
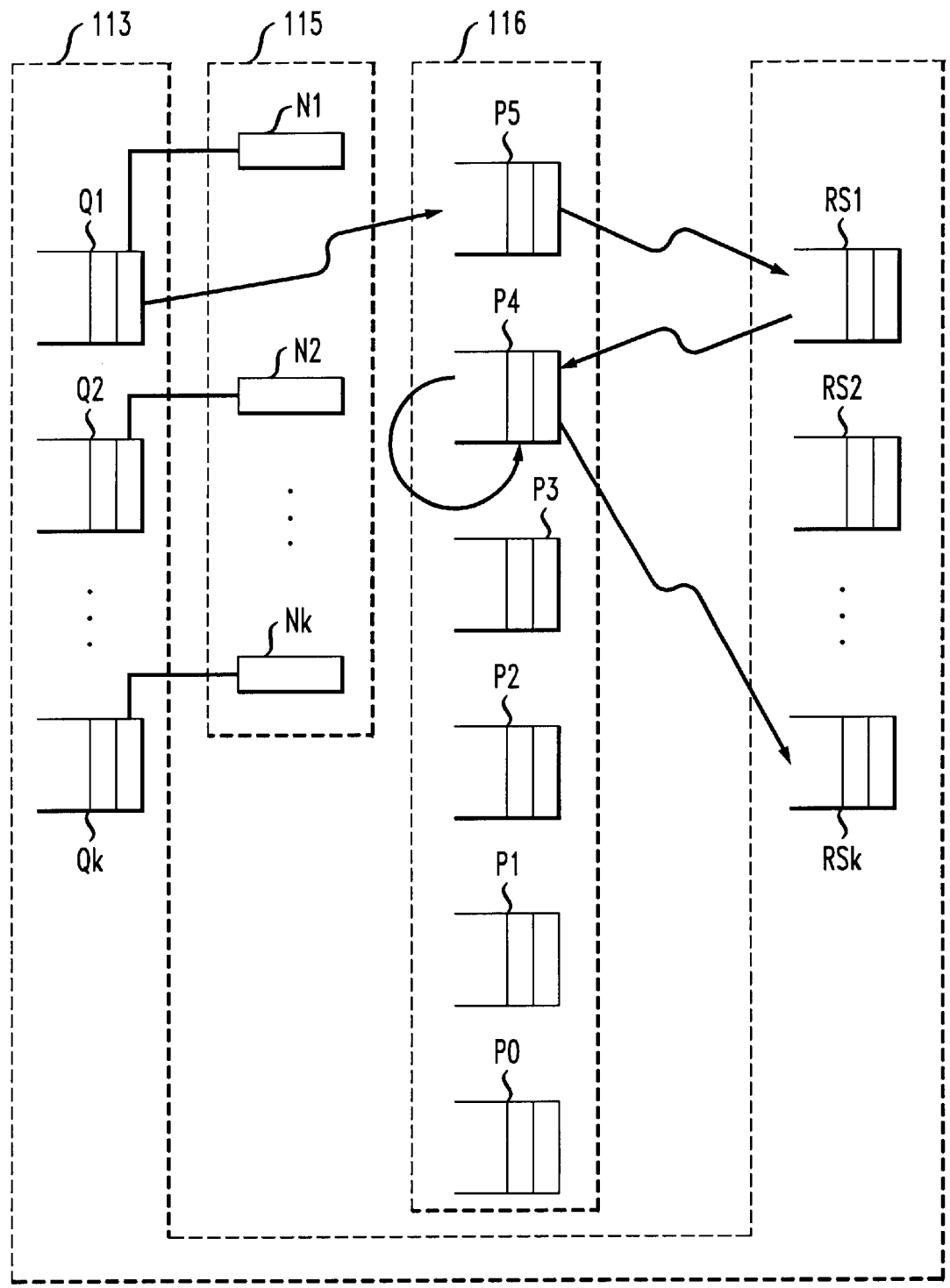
FIG. 2 illustrates in block diagram form a typical instance of a set of queues used by the processor-based system of FIG. 1 to manage the service requests received from a plurality of peripheral devices.

FIG. 1 illustrates in block diagram form the present self-adaptive processor overload control system 111 as implemented in a typical processor-based system 100 wherein a processor is network connected with a plurality of peripheral devices which generate service requests for service by the processor 102, while FIG. 2 illustrates in block diagram form a typical instance of a set of queues used by the processor-based system 100 of FIG. 1 to manage the service requests received from a plurality of peripheral devices.

The example of a real-time based system used herein is that of a telephone switching system 100, such as the #5ESS switching system manufactured by Lucent Technologies. Such a system entails the use of a plurality of peripheral devices, each of which typically serves a class of sub-systems. For example, a Line Unit 101 is a peripheral that serves a plurality of subscriber lines SL1–SLn, each of which interconnects a subscriber terminal equipment (such as a telephone station set) SE1–SEn with the Line Unit 101. The Line Unit 101 responds to on-hook and off-hook conditions on the subscriber lines SL1–SLn to generate service requests, which are transmitted to the processor 102 which manages call processing, such as the Switching Module Processor in the above-mentioned #5ESS switching system, for execution. Similarly, the Line Unit 101 responds to messages from the Switching Module Processor 102 to implement communication connections from the switching network 103 of the telephone switching system 100 to subscriber terminal equipment SE1–SEn that is connected to the subscriber lines SL1–SLn.

The self-adaptive processor overload control system 111 described herein is applicable to various types of operating systems typically used for call processing in a telephone switching system 100. For example, in the 5ESS Switching System, a fixed priority non-preemptive operating system is used. In this operating system, Priority 0 is the lowest priority, whereas Priority 7 is the highest priority. Routine audits in the operating system typically run at Priority 0, while call processing routines in the Switching Module Processor 102 run at Priority 5 and Priority 4, depending on the nature of the call processing routine. Priority 3 work in the Switching Module Processor 102 is for CCS incoming call request maintenance work. There are two pools of users in a call processing scenario: trunk originations from the Trunk Unit 104 and analog call originations from the Line Unit 101. Trunk origination calls are assumed to be initiated by receipt of a control message, such as an Initial Address Message (IAM). If a user has a call successfully set up through the switching network 103, then it is expected to remain active for a predetermined average time.

Characteristics of the Self-Adaptive Processor Overload Control System.

Figure 3A:
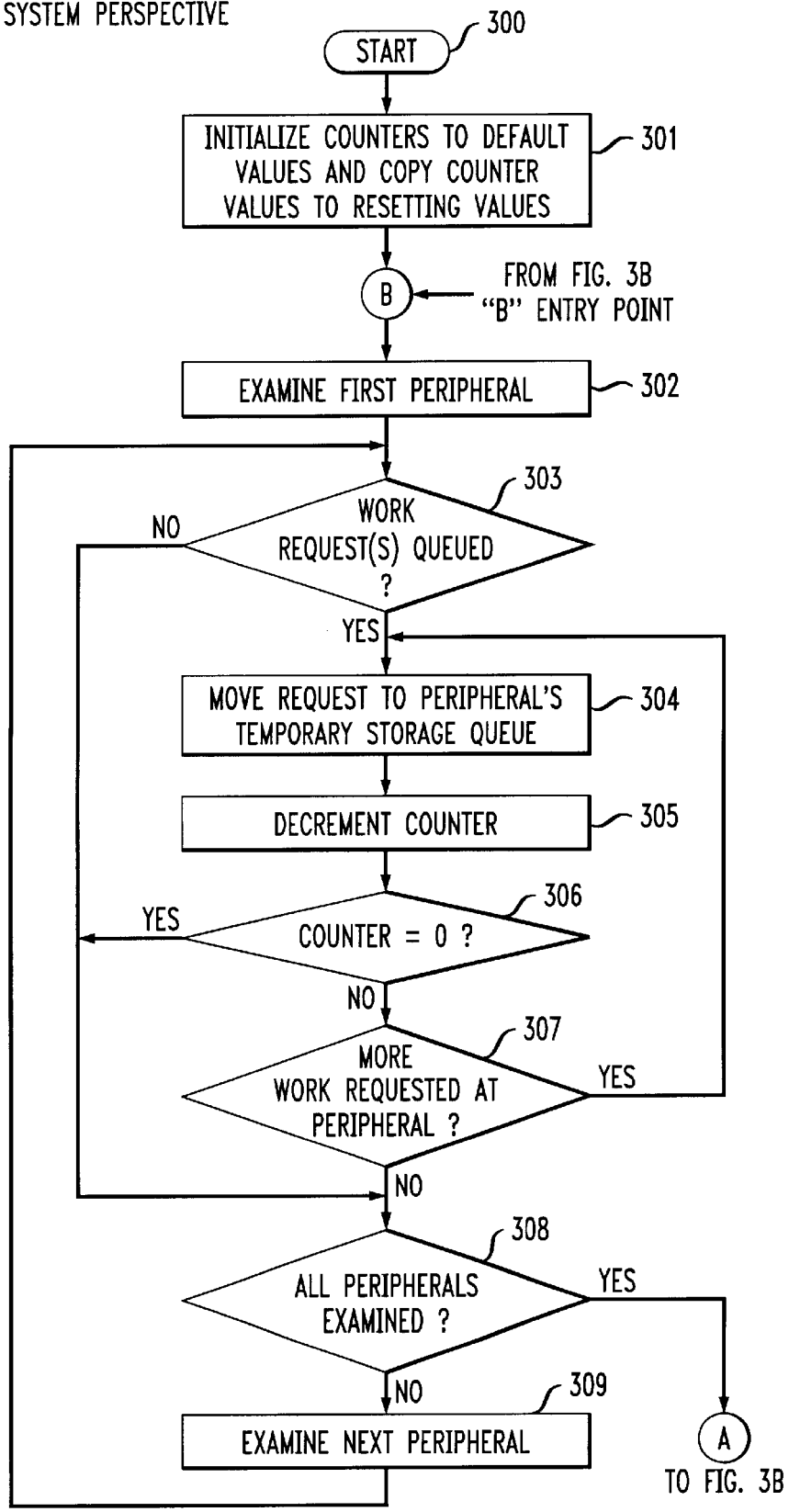
FIGS. 3A & 3B illustrate in flow diagram form the operation of the present self-adaptive processor overload control system.
Figure 3B:
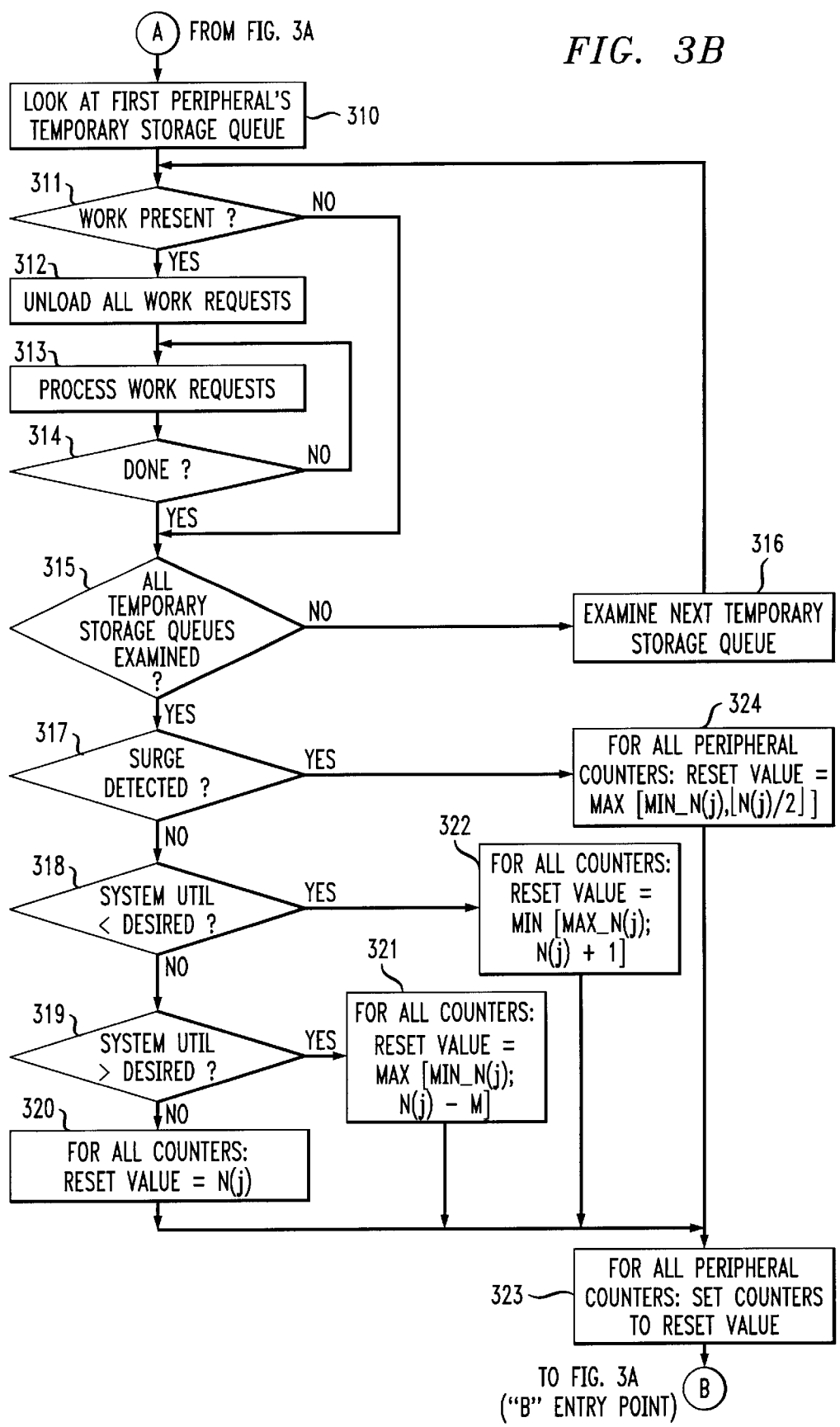

The present self-adaptive processor overload control system 111 executes in the Switching Module Processor 102 and eliminates existing problems encountered in the real-time overload control in call processing since the self-adaptive processor overload control system 111 does not shut down call processing under overload conditions; takes into account processor activity other than call processing; is capable of clamping surge traffic extremely quickly; has a wide adaptive range; has a design that matches the operation of the CPU instruction cache operation and increases cache hit ratio, thereby reducing average real-time needed to process call activity; and is capable of surge detection. FIGS. 3A & 3B illustrate in flow diagram form the operation of the present self-adaptive processor overload control system, which is a generic, operating system independent process, as implemented in the Switching Module Processor 102 of a typical telephone switching system 100, such as the above-noted #5ESS switching system.

In FIG. 2, there is a plurality of (virtual) queues Q1–Qk, each of which is a symbolic representation of a call/work request which is queued at a peripheral, waiting to be admitted to the Switching Module Processor 102 for service. For example, one queue Q1 can be the Message Handler to the Switching Module Processor 102 queue, another queue Q2 can be all of the analog users who are waiting to be admitted to the Switching Module Processor 102 for service, the next queue Qk can be Recent Change commands waiting to be given service. Each of the queues Q1–Qk has a counter N1–Nk associated with it. Let N(I) be the counter's present value for queue Qi and, during the processor's initialization process at step 301, the value of N(I) is set to a predetermined default value, which value is also stored in memory as a reset value. During the operation of the Switching Module Processor 102, this counter value N(I) ranges between zero and some predetermined maximum value. A plurality of unloading routines 116 are used to transfer the queued work requests from the peripheral device queues Qi to request storage queues RSi.

At step 302, the Switching Module Processor 102 examines the first peripheral device SE1 to determine at step 303 whether the peripheral device SE1 has a work request queued. Assume that queue Q1 has call requests waiting to be admitted at step 303 and the counter value N(1) for counter N1 is not zero. When the Priority 5 unloading routine P5 associated with this queue Q1 unloads a call request from the queue at step 304, it transfers the call request to request storage (temporary storage queue) RS1 and decrements the counter value N(1) of counter N1 at step 305 by a predetermined amount whenever a call request is loaded into the associated RS1 queue. The unloading of queue Q1 is halted if it is determined at steps 306 & 307 that there are no more work requests to unload of if the counter value N(1)=0. If the counter value N(1)=0 at the beginning of this process, no work requests are unloaded from queue Q1. Thus, in order to unload work requests from a queue, there must be requests queued in the queue and the value of the associated counter must be greater than zero. Once all of the requests queued in a particular queue are processed, processing advances to step 308 to determine whether all peripherals has been examined to locate work requests. If not, processing advances to step 309 where the next peripheral device is selected to be scrutinized as described above in steps 303–308.

In order to efficiently use a given set of call processing code, all of the queued entries are unloaded from a queue prior to processing the contents of the next queue. Therefore, once all of the queued work requests as unloaded by execution of steps 301–309, before processing advances to step 310. This results in a given set of call processing code being reused by Switching Module Processor 102 for each successive work request that is queued in a predetermined queue, which increases the temporal locality of this block of code, since Switching Module Processor 102 does not need to load this code into the cache memory 112 of Switching Module Processor 102, then flush the code and later reload the code, as in the case of work requests being handled in order of arrival or some other ordering. The call processing code is loaded into the cache memory 112 of Switching Module Processor 102 then used repeatedly until all of the work requests related to this code have been executed. This process increases the cache hit ratio Switching Module Processor 102 and reduces the mean real-time required to process work items.

In operation, at step 310, the Switching Module Processor 102 looks at the first peripheral's temporary storage queue Q1 to determine at step 311 whether there is a work request stored in this queue. If so, processing advances to step 312 where the Switching Module Processor 102 unloads all of the work requests from this queue Q1 to the appropriate Request Storage Queues, RS1 for example. The Switching Module Processor 102 at step 313 processes these requests and at step 314 determines whether the work is done. If so, processing advances to step 315 where Switching Module Processor 102 determines whether all of the temporary storage queues have been examined. If not, processing advances to step 316 where the next temporary storage queue is examined and processing returns to step 311. Steps 311–316 are executed until all of the temporary storage queues have been processed. At this juncture, processing advances to step 317 to determine whether a surge is present.

Low Priority Counter Reset Processes

Work admission to the Switching Module Processor 102 is run until either no more work is located or the queue counters reach zero at step 309. At this time, work admission from the peripherals halts and the full power of the Switching Module Processor 102 is dedicated to setting up call connections and running other work, which are Priority 5 and Priority 4 work items. As stated above, all the work in a temporary storage queue is done before the next temporary storage queue's work requests are processed. All call requests that were admitted are set up and, since Recent Change is also under the control domain of this overload control, any admitted Recent Change work also runs. Once all queues are emptied, then work admission is reactivated if the counters associated with the peripherals are not zero. If they are all zero, the counter value reset process (CVR) 114 runs to set the counter values.

The low priority counter value reset process 114 resets the counter values for all of the queues Q1–Qk and reinitiates the work admission process. By running the counter value reset routine CVR at a low priority, this ensures that work admission is reduced or halted before call processing commences and all higher priority work is completed before work admission is resumed. The use of a low priority counter value reset routine 114 also enables the self-adaptive processor overload control system 111 to vary the reset values of the counters N1–Nk depending on whether a surge is detected or whether the Switching Module Processor 102 estimated utilization (occupancy) is below or above the desired level. Finally, by running this process at a low priority (thus ensuring that input/output work and call processing work is finished before this process runs), the rate at which the counters are updated varies: at low occupancy, the process runs frequently whereas at high occupancy it runs infrequently.

One way to ensure a quick convergence to the desired utilization under a non-surge condition is to set the initial counter values N(1)–N(k) low and have the low priority counter value reset process 114 increase the counter values N(1)–N(k) based on the utilization estimate for the Switching Module Processor 102. The utilization estimate for Switching Module Processor 102 is assumed to include Priority 5 to Priority 2 processes. If the estimated utilization of Switching Module Processor 102 is below the desired utilization for Switching Module Processor 102 as determined at step 318, then the new counter values N(1)–N(k) for all counters N1–Nk can be set at step 322 as N(j)=min[Max_N(j), N(j)+1], where max_N(j) is the maximum permissible value for counter N(j). If the initial value of N(j) is very low, very little work is admitted from the peripheral associated with this counter. If this is the case for all peripherals, the measured utilization of the processor is low and the value reset process runs frequently. Thus, all counters have their values quickly incremented. As more work is admitted, the value reset process runs less frequently. Thus, the rate at which work is admitted decreases as the occupancy increases. If the control overshoots the utilization of Switching Module Processor 102 as determined at steps 318, 319, then a new counter value N(1)–N(k) can be recomputed at step 321 as N(j)=Max[(min_N(j), N(j)–m] where min_N(j) is the minimum permissible value for counter N(j) and m>1. The latter is done because at high utilization the counter reset is done infrequently. Should the control allow too much work to be admitted, ensuring that the decrementation value m is greater than the incrementation value allows the system's utilization overshoot to be rapidly reduced even though the counter updating is done infrequently. If at step 319 it is determined that the control matches the utilization of Switching Module Processor 102, then at step 320, all of the counter reset values are defined as the previously stored values of N(j). Once counter values are determined pursuant to one of these processes, at step 323 all peripheral counters are set to the determined values and processing returns to step 302 for the next cycle of request processing.

Surge Detection and Response

Whenever a request is moved into a request storage queue RS1–RSk, that request is time stamped (in the 5ESS, only call processing requests are time stamped). Periodically, a latency process at Priority 5 is run to see if any request is queued too long. Excessive queuing indicates that (1) too many requests are queued or (2) the Switching Module Processor 102 is too busy with other activities to process these requests. The only way these conditions arise is if (1) the number of requests allowed to be unloaded is high (i.e., counter values are high) and (2) a surge occurs. Since (average) queuing time is linearly proportional to queue size, another way of detecting a surge is to periodically scan queue sizes and compare against thresholds.

If the Switching Module Processor 102 is operating at a high utilization, then the probability that a surge influences the operation of the Switching Module Processor 102 is negligible. This is because the queue counters N1–Nk are operating at low reset values and the queue unloading rate is high. Thus, the Switching Module Processor 102 does not see the surge since the surge traffic is deflected into the queues Q1–Qk. For example, if all the users at the peripheral associated with queue Q1 request service at once, the processor moves only a small portion of these requests into temporary storage before the counter associated with this queue achieves a value of zero and no more requests are unloaded from the peripheral. The processor therefore does not see this traffic surge. Surges like the one just described can occur during call-in shows, disasters, and so forth. If the queue counter values N(1)–N(k) are high and a surge occurs, then the counter operation ensures that the incoming traffic is eventually turned off. If the queues RS1–RSk are excessively loaded, excessive queuing delays occur and cleanup activity is initiated. The presence of cleanup activity is an indication that a surge has occurred and the extent of the cleanup activity is a measure of the magnitude of the surge. When a surge is detected at step 317, all counters N1–Nk are reset since the origination and nature of the surge cannot quickly be determined. The new counter values N(1)–N(k) are set as N(j)=Max[min_N(j), [N(j)/2]] where [and] indicate that integer division is done to thereby rapidly decrease externally admitted work and drop the processor utilization. Once the surge condition disappears, then counter is set to a normal value. Thus, surge detection results in a very rapid decrease in the work admitted to the processor.

Summary

The self-adaptive processor overload control system provides real time overload control and is fast to respond to processing overload conditions. The self-adaptive processor overload control system can detect surges and also has a dynamic range that can address overloads of significant size. It matches software operation to the CPU instruction cache operation to thereby increase the processor efficiency by reducing the average real time needed to process call activity.

What is claimed:

1. A self-adaptive processor overload control system operational in a processor-based system, which includes a processor in communication with a plurality of peripherals that generate service requests, each service request being member of a class of service requests, for execution by said processor, for controllably managing the work load presented to said processor, comprising:

means for maintaining at least one queue for each of said classes of service to receive said service requests;

means for maintaining a counter associated with said at least one queue for each of said classes of service;

means for adjusting said counter's present value as a function of service requests received and processed, comprising:

means for varying the reset value of the counter as a function of at least one of: a surge is detected, and a processor estimated utilization is below a desired level, and a processor estimated utilization is above a desired level: and means for processing all of said service requests in a one of said classes of service prior to processing a service request in another one of said classes of service.

2. The self-adaptive processor overload control system of claim 1 further comprising:

means for initializing said counter's present value to a predetermined default value.

3. The self-adaptive processor overload control system of claim 1 further comprising:

means for unloading said queue to transfer each of said call requests to request storage; and means for decrementing said counter value by a predetermined amount for each of said call requests unloaded from said queue.

4. The self-adaptive processor overload control system of claim 3 further comprising:

means for halting unloading of said queue if it is determined that there are one of: no more work requests to unload and the counter value is 0.

5. The self-adaptive processor overload control system of claim 1 further comprising:

means, responsive to presence of cleanup activity, for generating an indication that a surge has occurred.

6. The self-adaptive processor overload control system of claim 1 further comprising:

means for activating said means for adjusting, wherein said counter is updated at a rate which varies: at low occupancy, the counter update process runs frequently whereas at high occupancy the counter update process runs infrequently.

7. A method of operating a self-adaptive processor overload control system that is operational in a processor-based system, which Includes a processor in communication with a plurality of peripherals that generate service requests, each service request being a member of a class of service requests, for execution by said processor, for controllably managing the work load presented to said processor, comprising the steps of:

maintaining at least one queue for each of said classes of service to receive said service requests;

maintaining a counter associated with said at least one queue for each of said classes of service;

adjusting said counter's present value as a function of service requests received and processed, comprising:

varying the reset value of the counter as a function of at least one of: a surge is detected, and a processor estimated utilization is below a desired level, and a processor estimated utilization is above a desired level; and processing all of said service requests in a one of said classes of service prior to processing a service request in another one of said classes of service.

8. The method of operating a self-adaptive processor overload control system of claim 7 further comprising the step of:

initializing said counter's present value to a predetermined default value.

9. The method of operating a self-adaptive processor overload control system of claim 7 further comprising the steps of:

unloading said queue to transfer each of said call requests to request storage; and decrementing said counter value by a predetermined amount for each of said call requests unloaded from said queue.

10. The method of operating a self-adaptive processor overload control system of claim 9 further comprising the step of:

halting unloading of said queue if it is determined that there are one of: no more work requests to unload and the counter value is 0.

11. The method of operating a self-adaptive processor overload control system of claim 7 further comprising the step of:

generating, in response to presence of cleanup activity, an indication that a surge has occurred.

12. The method of operating a self-adaptive processor overload control system of claim 7 further comprising the step of:

activating said step of adjusting, wherein said counter is updated at a rate which varies: at low occupancy, the counter update process runs frequently whereas at high occupancy the counter update process runs infrequently.

13. A self-adaptive processor overload control system operational in a processor-based system, which includes a processor in communication with a plurality of peripherals that generate service requests, each service request being a member of a class of service requests, for execution by said processor, for controllably managing the work load presented to said processor, comprising:

queue means for maintaining at least one queue for each of said classes of service to receive said service requests;

counter means for maintaining a counter associated with said at least one queue for each of said classes of service;

queue counter maintenance means for adjusting said counters present value as a function of service requests received and processed, comprising:

counter reset means for varying the reset value of the counter as a function of at least one of: a surge is detected, and a processor estimated utilization is below a desired level, and a processor estimated utilization is above a desired level: and service processor means for processing all of said service requests in a one of said classes of service prior to processing a service request in another one of said classes of service.

14. The self-adaptive processor overload control system of claim 13 further comprising:

queue initialization means for initializing said counter's present value to a predetermined default value.

15. The self-adaptive processor overload control system of claim 13 further comprising:

service request means for unloading said queue to transfer each of said call requests to request storage; and queue decrementing means for decrementing said counter value by a predetermined amount for each of said call requests unloaded from said queue.

16. The self-adaptive processor overload control system of claim 15 further comprising:

service processing termination means for halting unloading of said queue if it is determined that there are one of: no more work requests to unload and the counter value is 0.

17. The self-adaptive processor overload control system of claim 13 further comprising:

surge detection means, responsive to presence of cleanup activity, for generating an indication that a surge has occurred.

18. The self-adaptive processor overload control system of claim 13 further comprising:

counter update cycle means for activating said queue counter maintenance means, wherein said counter is updated at a rate which varies: at low occupancy, the counter update process runs frequently whereas at high occupancy the counter update process runs infrequently.

* * * * *